United States Patent [19]

Karakawa

[11] Patent Number: 4,846,512

[45] Date of Patent: Jul. 11, 1989

[54] PROTECTIVE CYLINDER FOR PIPE COVERING MATERIAL

[75] Inventor: Kazuo Karakawa, Koga, Japan

[73] Assignee: Yamato Kogyo Kabushiki Kaisha, Ibaraki, Japan

[21] Appl. No.: 130,212

[22] Filed: Dec. 8, 1987

[30] Foreign Application Priority Data

Dec. 19, 1986 [JP] Japan .................... 61-195601

[51] Int. Cl.$^4$ ............................. F16L 55/00
[52] U.S. Cl. ...................... 285/424; 285/45
[58] Field of Search ................ 285/424, 45

[56] References Cited

U.S. PATENT DOCUMENTS

| | | | |
|---|---|---|---|
| 1,051,461 | 1/1913 | Smith | 285/424 X |
| 1,301,096 | 4/1919 | Brockest | 285/424 X |
| 3,071,214 | 1/1963 | Steinbichler | 285/424 X |
| 3,233,927 | 2/1966 | De Whirst | 285/424 X |
| 3,361,147 | 1/1968 | Timmons | 285/424 X |
| 3,479,073 | 11/1969 | Collins | 285/424 X |

*Primary Examiner*—Dave W. Arola
*Attorney, Agent, or Firm*—Oblon, Fisher, Spivak, McClelland & Maier

[57] ABSTRACT

A protective cylinder (3) for pipe insulation. The protective cylinder (3) is cut at the rear side of the upper part of a folded section of one edge through a predetermined vertical distance $l_1$ from the upper end of a first longitudinal edge. The cut extends obliquely downwardly and outwardly at the front by the same vertical distance $l_1$ along a first guide line (9) obliquely downwardly and outwardly extending from a first radius portion (9a) at the upper end of the one edge, to an outside bent portion, to form thereby a first engagement portion extending along the first guide line. This serves as both a fitting guide and a rotation stopper. The cylindrical member also has a second longitudinal edge cut slightly obliquely outwardly and downwardly at the upper part thereof by a predetermined vertical distance $l_3$ from a second radius portion (10a) at the upper end of the other edge spaced at a horizontal distance $l_2$ from the second longitudinal edge. The cut extends along a second guide line (10b) slightly obliquely outwardly and downwardly from the second radius portion (10a), to form a portion of the second longitudinal edge downwardly spaced by the distance $l_3$ from the upper end with a second engagement portion with a vertical length $l_4$ serving as at least a rotation stopper.

4 Claims, 6 Drawing Sheets

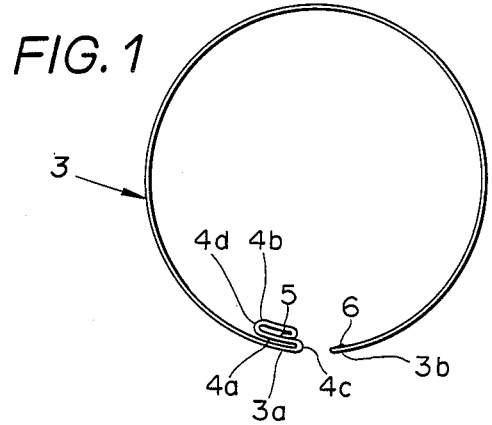
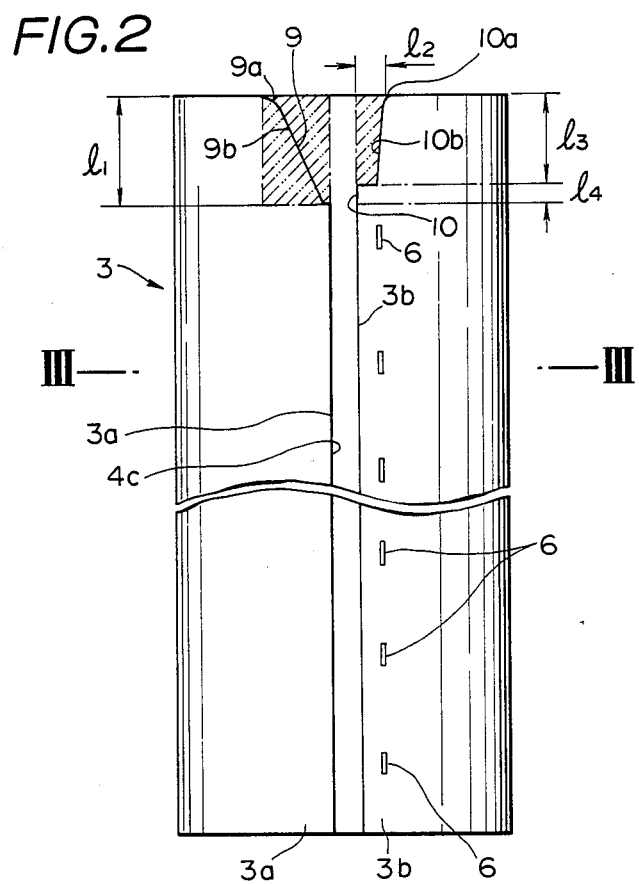

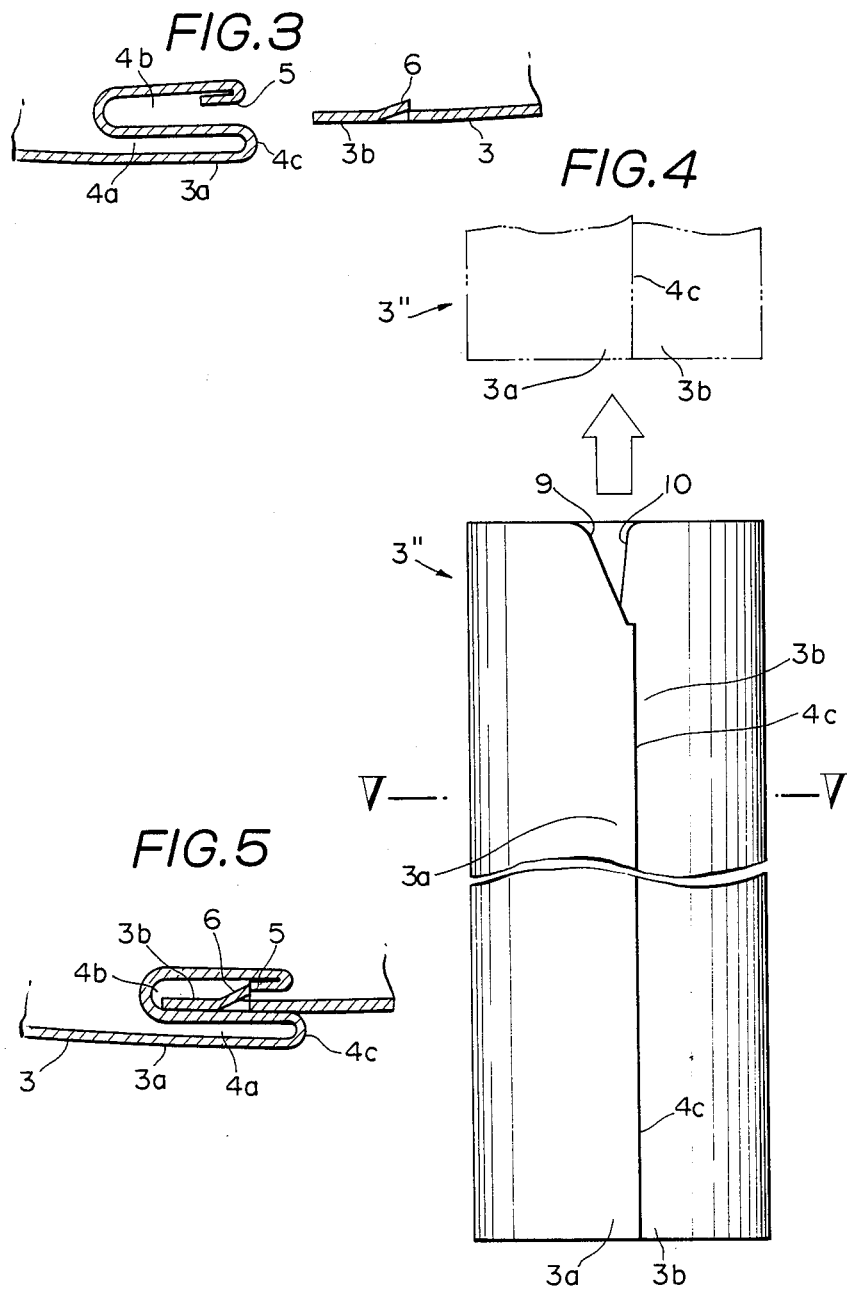

FIG. 6
FIG. 7
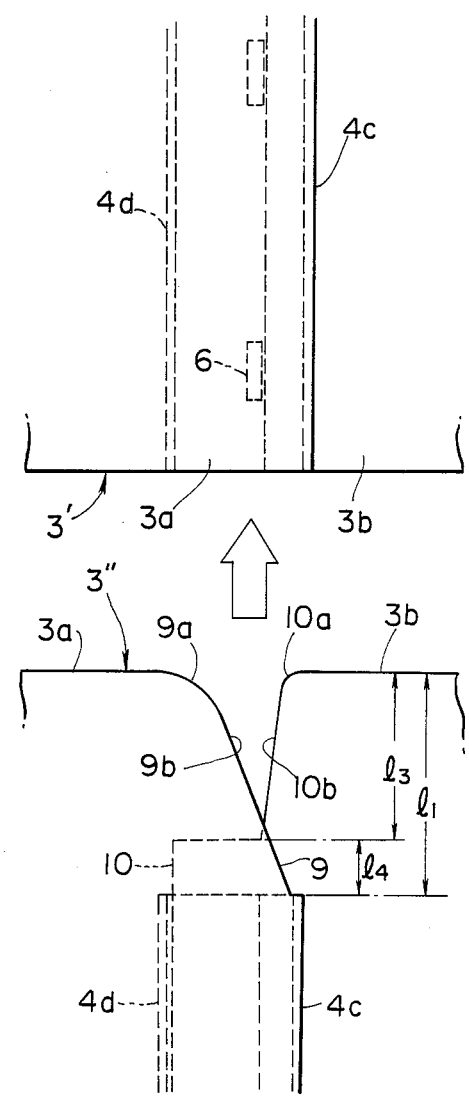
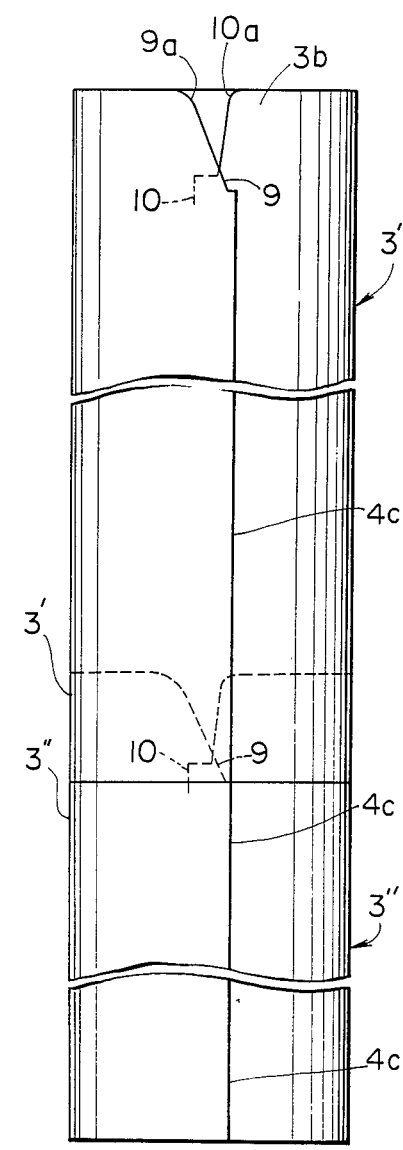

PROTECTIVE CYLINDER FOR PIPE COVERING MATERIAL

BACKGROUND OF THE INVENTION

1. Field of the Invention

This invention relates to a protective cylinder for a pipe covering material. The invention is particularly applicable to a cylindrical protective tube for protectively covering the periphery of a covering material such as a heat insulating material located on an outer surface of a pipe for airconditioning piping arranged on the interior and/or exterior of a building. Such a protective cylinder is formed into a predetermined length and mounted on the covering material, an appropriate number of protective cylinders being used depending upon the length of the pipe. The cylinders are connected together through fittings between the upper and lower ends of vertically adjacent cylinders in situ.

2. Description of the Prior Art

A conventional protective cylinder will be described with reference to FIGS. 11 to 13.

FIG. 11 is a fragmentary enlarged sectional view showing part of a fitted connection between conventional protective cylinders, connected together;

FIG. 12 is a perspective view showing another conventional protective cylinder system in position; and FIG. 13 is a fragmentary enlarged sectional view showing part of a connection between the protective cylinders of FIG. 12, connected together.

A conventional protective cylinder generally designated by reference numeral 3 in FIG. 11 is formed by folding one longitudinal edge 3a of a rectangular blank plate (such as a tin plate) twice, to provide a folded section and to form inwardly and outwardly open slits 4a and 4b and an outside bent portion 4c at the edge. The tip of the edge is bent inwardly to form an inside holding rim 5, and the opposite longitudinal edge 3b of the blank plate is pressed to form the edge with step-like stoppers 6 which project inwardly from an inner surface of the edge and are arranged at equal intervals in the longitudinal direction of the blank plate.

A modification of this system is constructed as shown in FIGS. 12 and 13. In the modification, upper sections of portions of both edges 3a and 3b which are respectively folded and provided with the stoppers 6 are cut away to eliminate the slits 4a and 4b and the stoppers 6, thereby forming cut-outs 7 and 8 of a small rectangular shape.

Arrangement of the protective cylinder 3 of FIG. 11 on the outer periphery of a covering material is carried out by mounting, on the covering material, the number of protective cylinders 3 required depending on the length of the pipe on which the covering material is arranged and connecting the protective cylinders 3 to each other in turn in situ.

Fixing of each of the protective cylinders 3 on the covering material is carried out by bending the protective cylinder 3 around the outer periphery of the covering material to fit the former on the latter and then inserting the opposite longitudinal edge 3b into the outwardly open slit 4b of the longitudinal edge 3a to engage step-like stopper 6 with the inside holding rim 5 by means of the elasticity of the protective cylinder 3.

A plurality of the protective cylinders 3 are each fixed on the pipe in a continuous length as described above, and the protective cylinders 3 are connected to one another through their upper and lower ends in turn.

The connection between adjacent protective cylinders 3 constructed as described above is carried out by fitting a lower end portion of an upper side protective cylinder 3' on an upper end portion of a lower-side protective cylinder 3'' while slightly contracting the upper end of the lower side protective cylinder 3''.

However, the lower-side protective cylinder 3'' shown in FIG. 11 lacks any means for facilitating insertion of its upper end portion into the lower end portion of the upper-side protective cylinder 3'. Thus, it is necessary to insert the outside bent portion 4c of the lower-side protective cylinder 3'' bent to define the inwardly open slit 4a forcibly and overlappingly into the inwardly open slit 4a of the upper-side protective cylinder 3' while at the same time forcing the opposite longitudinal edge 3b of the lower-side protective cylinder 3'' provided with the stoppers 6 into the outwardly open slit 4b of the upper-side protective cylinder 3' while enlarging the slits 4a and of the upper side protective cylinder 3'. This results in the connecting operation being troublesome, requiring much time and effort. Additionally the protective cylinders connected together are unsightly due to the enlargement of the overlapped connection portions.

The protective cylinder system shown in FIGS. 12 and 13 eliminates some of the above disadvantages of the system shown in FIG. 11. Particularly, the cut-outs 7 and 8 which are provided at the upper ends of the edges 3a and 3b of the protective cylinder 3 to form the upper end of the cylinder 3 into a simple cylindrical shape, so that fitted connection between the upper-side and lower-side protective cylinders 3' and 3'' may be readily carried out by merely fitting the upper portion of the lower side protective cylinder 3'' in the lower end portion of the upper side protective cylinder 3'. Also, abutment of the longitudinal edges 3a of both protective cylinders 3' and 3'' against each other in a manner to align the outside bent portions 4c of the cylinders with each other considerably improves the unshapeliness of the connected cylinders of FIG. 11.

Nevertheless, the protective cylinder 3 FIGS. 12 and 13 fails to enable the initial fitting between adjacent upper-side and lower-side protective cylinders to be carried out smoothly because the cut-outs 7 and 8 are merely formed into a small rectangular shape.

Furthermore, the protective cylinder of FIGS. 12 and 13 permits the outside bent portions 4c of the connected cylinders 3' and 3'' to be linearly aligned with one another at a final step after each connection. However, the upper end of the protective cylinder 3 is formed into a cylindrical shape due to existence of the cut-outs 7 and 8 as described above. This shape causes the lower side protective cylinder 3'' to be readily rotatable with respect to the upper side protective cylinder, 3', so that it is substantially impossible to keep the outside bent portions 4c linearly aligned with each other. This still leads to unshapeliness of the connected protective cylinders.

For example, when the protective cylinder is used to cover pipes tens of meters or more in length which are located in noticeable locations on a building, a substantial failure in alignment of the outwardly bent portions 4c deteriorates the appearance of the connected cylinders.

OBJECT OF THE INVENTION

The present invention has been made in view of the foregoing disadvantages of the prior art.

Accordingly, it is an object of the present invention to provide a protective cylinder construction for a pipe covering material or insulation which is capable of smoothly accomplishing a fitted connection between protective cylinders efficiently, which results in the connected protective cylinders showing a good appearance.

SUMMARY OF THE INVENTION

In accordance with the present invention, there is provided a protective cylinder for a pipe covering material comprising a cylindrical member having two opposite edges extending longitudinally. One of the edges is longitudinally folded twice to provide a longitudinally extending folded section including longitudinally extending outside and inside bent portions and inwardly and outwardly opening slits. The end of a first edge is bent inwardly to form an inside holding rim extending longitudinally, and second edge is formed with a plurality of stoppers which project inwardly from the inner surface and are arranged at intervals in a longitudinal direction. The cylindrical member is cut at the rear of the upper part of the folded section of the first edge through a predetermined vertical distance $l_1$ from the upper end, the cut extending obliquely downwardly and outwardly at the front through the vertical distance $l_1$ along a first guide line extending from a first radius portion at the upper end of the first edge to the outside bent portion, thus forming a first engagement portion extending along the first guide lines. The cylindrical member is cut obliquely downwardly and downwardly at the upper part of the second edge through a predetermined vertical distance $l_3$ from a second radius portion at the upper end of the other edge, spaced at a horizontal distance $l_2$ from the second edge. The second cut extends along a second guide line from the second radius portion, thus forming a second engagement portion in the second edge, downwardly spaced by the distance $l_3$ from the upper end and having a vertical length $l_4$, the distance $l_2$ being equal to the distance between the second edge and the stoppers.

The first engagement portion may serve as a fitting guide and as a means for preventing relative rotation. The second engagement portion may serve as at least a means for preventing relative rotation. Preferably, the second guide line extends slightly obliquely downwards and outwards.

Preferably, the distance $l_1$ corresponds to the which of overlapping between two vertically adjacent protective cylinders fittedly connected together through the engagement portions at the upper end portion of the lower protective cylinder.

Preferably, the connection between the lower end of an upper cylinder and the upper end of a lower cylinder of two vertically adjacent similar protective cylinders through the radius portions and the guide lines causes the first engagement portion of the lower cylinder to abut against the inside of the outside bent portion of the first edge of the upper cylinder.

Preferably, the second engagement portion of the lower protective cylinder abuts against the inside of the inside bent portion to prevent relative rotation between the two protective cylinders, resulting in the outside bent portions of the protective cylinders being linearly aligned with one another.

BRIEF DESCRIPTION OF THE DRAWINGS

Other objects and many of the attendant advantages of the present invention will be readily appreciated as the same becomes better understood by reference to the following detailed description when considered in connection with the accompanying drawings, wherein:

FIG. 1 is a plan view of the embodiment of a protective cylinder for a pipe covering material according to the present invention;

FIG. 2 is a front elevation of the protective cylinder shown in FIG. 1;

FIG. 3 is a fragmentary enlarged sectional view taken along line III—III of FIG. 2;

FIG. 4 is a front elevation of the protective cylinder of FIG. 1, fittedly mounted;

FIG. 5 is a fragmentary enlarged sectional view taken along line V—V of FIG. 4;

FIG. 6 is a fragmentary enlarged front elevation showing the relevant portions of adjacent upper and lower protective cylinders arranged opposite to each other for connection;

FIG. 7 is a front elevation showing the upper and lower protective cylinders of FIG. 6 connected together;

FIGS. 1 to 10 illustrate an embodiment of a protective cylinder for a pipe covering material according to the present invention.

DETAILED DESCRIPTION OF THE PREFERRED EMBODIMENT

Figure 8:
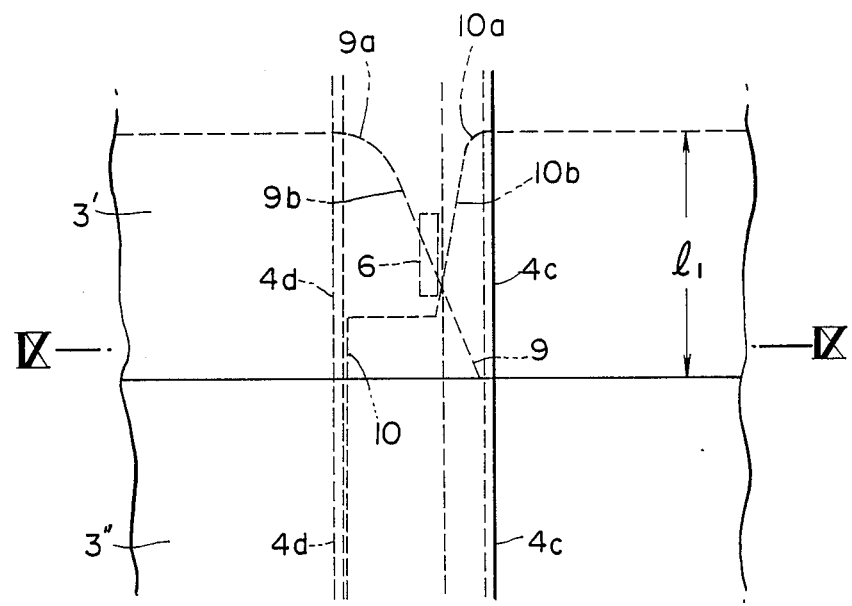
FIG. 8 is a fragmentary enlarged front elevation showing the connection between the upper and lower protective cylinders of FIG. 7 when connected together.

The invention may be carried into practice in various ways and one embodiment will now be described by way, of example with reference to FIGS. 1 to 10 of the accompanying drawings.

A protective cylinder of the illustrated embodiment generally designated by the reference numeral 3 is formed by folding a first longitudinal edge 3a of a rectangular blank plate twice to provide a folded section to form an inwardly opening slit 4a and an outwardly opening slit 4b as well as an outside bent portion 4c and an inside bent portion 4d at the first longitudinal edge. The tip end of the edge 3a is bent inwardly to form an inside holding rim 5, and the second longitudinal edge 3b of the blank plate is subjected to a pressing to form the edge 3b with step-like stoppers 6 which project inwardly from an inner surface of the second longitudinal edge 3b and are arranged at equal intervals in the longitudinal direction of the blank plate. The blank plate is then bent into a cylindrical shape to form a cylindrical member, as in the conventional protective cylinder.

The protective cylinder 3 or cylindrical member, as shown in FIG. 2 is cut vertically downwardly at the rear side of the upper portion of the folded section of the first longitudinal edge 3a through a predetermined vertical distance $l_1$ from the upper end and cut obliquely downwardly and outwardly at the front side through the vertical distance $l_1$ along a first guide 9b which extends obliquely downwardly and outwardly from a first radius portion 9a at the upper end to the outside bent portion 4c, so that a first engagement region 9 is formed having a vertical distance $l_1$ which extends obliquely downwardly and outwardly from the upper end to the first longitudinal edge 3a. This serves both as a fitting guide and to prevent rotation.

The protective cylinder 3 is also slightly obliquely downwardly and outwardly cut at the upper part of the second longitudinal edge 3b by a vertical distance $l_3$ from a second radius portion 10a at the upper end.

The second radius portion 10a is spaced at a horizontal distance $l_2$ from the second longitudinal edge 3b, and the cut extends along a second guide line 10b slightly obliquely downwardly and outwardly extending from the second radius portion 10a. The second longitudinal edge 3b is formed at a portion downwardly spaced by the distance $l_3$ from the upper end with second engagement region 10 of a vertical length $l_4$ ($l_4 = l_1 - l_3$) which serves as a rotation stopper. The distance $l_2$ is determined to correspond to the distance between the second longitudinal edge 3b and the stoppers 6.

The predetermined length $l_1$ corresponds to the extent of overlap between two cylinders which are connected together while being guided by the first and second engagement regions 9 and 10.

Figure 9:
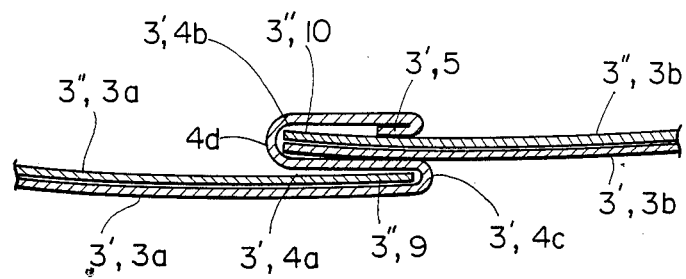
FIG. 9 is a cross sectional view taken along line IX—IX of FIG. 8.

In the above-described construction of the illustrated embodiment, when the upper end portion of the lower protective cylinder 3" is fitted to the lower end portion of the upper protective cylinder 3' while being guided by the radius portions 9a and 10a and the guide lines 9b and 10b, the first engagement region 9 of the lower protective cylinder 3" is fitted or inserted into the inwardly open slit 4a and abuts against the inside of the outside bent portion 4c to prevent rotation of the lower protective cylinder 3" in a right or anti-clockwise direction. The second engagement region 10 of the lower protective cylinder 3" is inserted in the outwardly open slit 4b of the upper protective cylinder 3" and abuts against the inside of the inside bent portion 4d to prevent rotation of the lower protective cylinder 3" in a left or clockwise direction, as shown in FIGS. 8 and 9.

Thus, it will be noted that the illustrated embodiment permits two protective cylinders to be fittedly connected to each other while preventing rotating of both in either direction, resulting in an ensured linear alignment between the outside bent portions 4c of the two cylinders.

The manner of operation for making the connection between two vertically adjacent cylinders will now be described.

First, the upper end of the lower protective cylinder 3" located on the covering material 2 (see FIG. 10) of the pipe 1 is brought to the lower end of the upper protective cylinder 3', which is already located on the covering material 2, while slightly contracting the upper end of the lower protective cylinder 3" to reduce its diameter, as shown in FIGS. 3 to 6.

Then, the first radius portion 9a of the first engagement region 9 and the second radius portion 10a of the second engagement region 10 of the upper protective cylinder 3' are inserted in the slits 4a and 4b of the lower protective cylinder 3', respectively. The insertion can be carried out smoothly due to the round configuration of each of the radius portions.

Subsequently, the lower protective cylinder 3" is pushed upwards so that its upper end portion fits in the lower end portion of the upper protective cylinder 3' by the distance $l_1$. This causes the lower end of the first guide line 9b and the second engagement region 10 of the lower protective cylinder 3" to be respectively abutted against the inside of the outside bent portion 4c and the inside of the inside bent portion 4d of the upper protective cylinder 3' as shown in FIGS. 7 to 9, so that the first and second engagement region 9 and 10 may effectively prevent rotation of the lower protective cylinder 3" in both the anticlockwise and clockwise directions, respectively.

Figure 10:
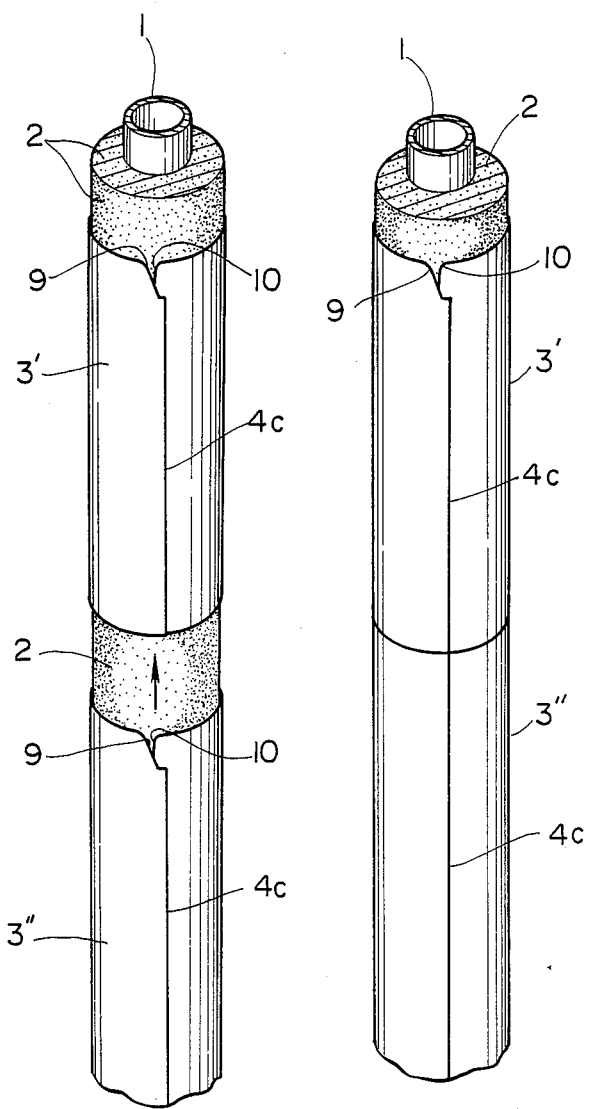
FIG. 10 is a perspective view showing the protective cylinders of FIG. 1 mounted on a pipe covering material.
Figure 11:
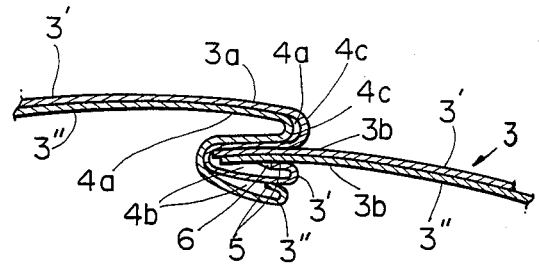
FIG. 11 is a fragmentary enlarged sectional view showing part of a fitted connection between conventional protective cylinders, connected together.
Figure 13:
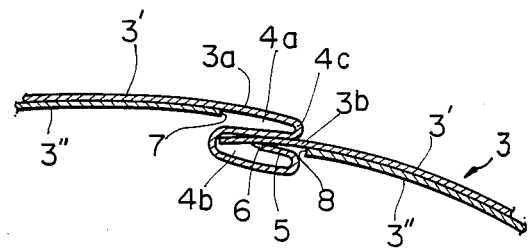
FIG. 13 is a fragmentary enlarged sectional view showing part of a connection between the protective cylinders of FIG. 12, connected together.
Figure 12:
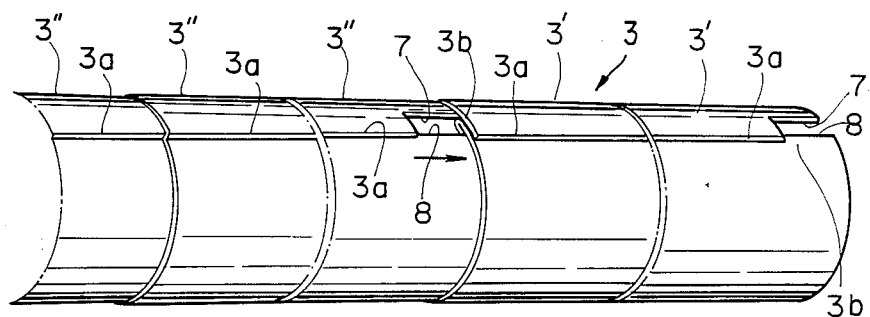
FIG. 12 is a perspective view showing another conventional protective cylinder system in position.

Thus, the outside bent portions 4c of both cylinders 3' and 3" are linearly aligned with each other, as shown in FIG. 10.

As can be seen from the foregoing, in the protective cylinder of the present invention, the two longitudinal edges 3a and 3b are provided with the specifically shaped engagement regions 9 and 10 having radius portions 9a and 10a, respectively. Such a construction permits the initial fitting operation with respect to the slits 4a and 4b to be carried out smoothly due to the round configuration of the radius portions 9a and 10a. Furthermore, the subsequent fitting operation can also be attained smoothly due to the oblique guiding of the guide lines 9b and 10b. Thus, it will be noted that the present invention accomplishes fitting and connection of the protective cylinders with improved efficiency.

In particular, the present invention facilitates the fitting and connecting operation even in a narrow space with limited play.

Also, both the engagement regions 9 and 10 are of predetermined lengths such that they respectively abut against the insides of the outside and inside bent portions 4c and 4d, effectively preventing rotation of both cylinders. The construction not only permits the outside bent portions 4c of the protective cylinders to be linearly aligned with one another, but also positively keeps the alignment without being affected by any external forces such as rotational forces or torsional loads applied to the protective cylinders. This results in ensuring good appearance of the protective cylinders when connected together.

Obviously, many modifications and variations of the present invention are possible in light of the above teachings. It is therefore to be understood that, within the scope of the appended claims, the invention may be practiced otherwise than as specifically described.

What is claimed as new and desired to be secured by letters patent of the United States is:

1. A protective cylinder for a pipe covering material, said protective cylinder comprising:
   (a) a cylindrical member having a longitudinal axis inner and outer surfaces and a first longitudinal edge, a second longitudinal edge opposite to said first longitudinal edge, a first circumferential edge, and a second circumferential edge opposite to said first circumferential edge;
   wherein:

(b) said first longitudinal edge is longitudinally folded:

(i) first inwardly relative to the axis of said protective cylinder and back relative to the inner surface of said protective cylinder to provide an outside bent portion facing said second longitudinal edge, a first flap parallel to the inner surface of said protective cylinder, and an inwardly open slit between said first flap and the inner surface of said protective cylinder;

(ii) second inwardly relative to the axis of said protective cylinder and back relative to said first flap to provide an inside bent portion facing away from said second longitudinal edge, a second flap parallel to the inner surface of said protective cylinder, and an outwardly open slit between said first flap and said second flap; and (iii) third outwardly relative to the axis of said protective cylinder and back relative to said second flap to provide an inside holding rim between said first and second flaps;

(c) said second longitudinal edge is formed with a plurality of stoppers in a line parallel to and spaced from said second longitudinal edge:

(i) which project inwardly from the inner surface of said protective cylinder and (ii) which are arranged at intervals in the longitudinal direction;

(d) said cylindrical member is cut begining at said first circumferential edge through a predetermined longitudinal distance $l_1$ from said first circumferential edge, the cut extending obliquely toward said first longitudinal edge through the longitudinal distance $l_1$ along a first guide line extending from a first radius portion at said first circumferential edge to said outside bent portion, thus forming a first engagement region extending along said first guide line;

(e) said cylindrical member is cut beginning at said first circumferential edge obliquely through a predetermined longitudinal distance $l_3$ from a second radius portion at said first circumferential edge to a point spaced at a circumferential distance $l_2$ from said second longitudinal edge, the cut extending along a second guide line from said second radius portion, thus forming a second engagement region in said second longitudinal edge, longitudinally spaced by the distance $l_3$ from said first circumferential edge and having a longitudinal length $l_4$; and (f) the distance $l_2$ is equal to the distance between said second longitudinal edge and said plurality of stoppers.

2. A protective cylinder as claimed in claim 1 in which the distance $l_1$ corresponds to the width of overlapping between two longitudinally adjacent protective cylinders fittedly connected together through said engagement regions.

3. A protective cylinder as claimed in claim 1 or claim 2 in which the connection between one end of a first protective cylinder and the adjacent end of a second protective cylinder of two longitudinally adjacent protective cylinders through said first and second radius portions and said guide lines causes said first engagement region of said second protective cylinder to abut against said outside bent portion of said first longitudinal edge of said first protective cylinder.

4. A protective cylinder as claimed in claim 3 in which said second engagement region of said second protective cylinder abuts against said inside bent portion of said first longitudinal edge of said first protective cylinder to prevent relative rotation between the two protective cylinders, resulting in said outside bent portions of the two protective cylinders being linearly aligned with one another.

* * * * *